2,834,794
DERIVATIVES OF 4-ANILINO-3-NITROBENZENE-SULFONAMIDE

John D. Sterling, Jr., Wenonah, N. J., and John W. Richter, Wilmington, Del., assignors to E. I. du Pont de Nemours and Company, Wilmington, Del., a corporation of Delaware No Drawing. Application August 8, 1957
Serial No. 676,916

4 Claims. (Cl. 260—397.7)

This invention relates to novel tertiary bases derived from 4-anilino-3-nitrobenzene-sulfonamide, which are useful per se and which may be converted into ammonium salts or quaternary ammonium compounds. In all these forms, the novel compounds are useful as dyes for hydrophobic textile fiber, particularly acid-modified "Dacron" polyester fiber, being applicable thereto from an acidified aqueous dye bath when in the form of tertiary base, or from a neutral aqueous dye bath when in the form of salt or quaternary ammonium compound.

By acid-modified "Dacron" fiber, we mean polyethylene-terephthalate fiber containing metal sulfonate groups, as described more fully and claimed in Belgian Patent No. 549,179, granted July 14, 1957, to E. I. du Pont de Nemours and Company, on the application of J. M. Griffing and W. R. Remington.

More particularly, this invention deals first of all with novel bases of the formula

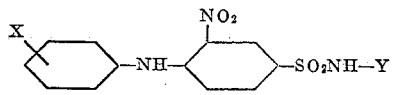

wherein Y stands for hydrogen, alkyl (of 1 to 4 C-atoms), phenyl, tolyl, biphenyl and alkoxy-phenyl (of 1 to 4 C-atoms in the alkoxy group), and wherein X is a tertiary nitrogenous base radical selected from the group consisting of dialkylaminoalkyl, for instance dialkylaminomethyl, dialkylaminoethyl or dialkylaminopropyl, and dialkylaminoalkoxy, for instance dialkylaminoethoxy or dialkylamino-propoxy.

In all the instances above, the alkyl radicals mentioned are preferably radicals containing from 1 to 4 C-atoms each, while the alkoxy group of the alkylaminoalkoxy radical contains from 2 to 4 C-atoms.

These compounds are synthesized by reacting in aqueous alkaline medium a 4-chloro-3-nitrobenzene-sulfonamide of the formula

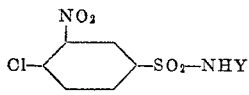

wherein Y has the same meaning as above, with an aniline compound of the formula

wherein X has the same meaning as above.

The reaction product resulting from this reaction is generally isolated in the form of free base, having the formula hereinabove given. In this form the product may be applied to acid-modified "Dacron" polyester fiber as a basic dye; that is, from an acidified aqueous bath, producing on the fiber yellow dyeings of good light fastness.

But said free base may also be converted into a salt form by dissolving the base in a suitable organic solvent, for instance methanol or butanol, warming up, and adding a suitable acid such as hydrogen chloride, hydrogen bromide, sulfuric acid, nitric acid, phosphoric acid, etc. The acid may be anhydrous or it may be in the form of an aqueous solution.

The free base may also be converted in known manner into quaternary ammonium compounds, using any convenient quaternizing agent, for instance dimethyl sulfate, benzyl chloride, phenethyl chloride, etc.

The salts and quaternary compounds thus formed are directly soluble in water and may be applied to the mentioned fiber from an aqueous bath, producing thereon yellow dyeings of good light fastness.

Without limiting this invention, the following examples are given to illustrate our preferred mode of operation. Parts mentioned are by weight.

Example 1

A mixture of 4.75 parts of 4-chloro-3-nitrobenzene-sulfonamide, 6.0 parts of β-dimethylamino-p-phenetidine, 4.0 parts of sodium carbonate, 50 parts of water, 50 parts of n-propanol and 0.2 part of a long chain alcohol sulfate is stirred under reflux for 8 hours. After cooling to room temperature, the condensation product is filtered off, in the form of the tertiary amine, washed with a 50% aqueous solution of isopropyl alcohol, and dried at 70° C. The base is converted to the hydrochloride by dissolving in hot butanol and passing-in hydrochloric acid gas until saturated. The mass is then cooled and the final product is filtered off, washed with butanol and dried. It is $N^4$-[p-(2-dimethylaminoethoxy)phenyl]-3-nitrosulfanilamide hydrochloride of the structure

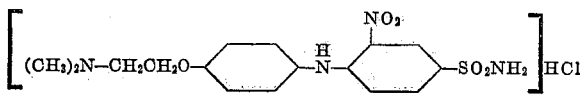

A higher homolog of the dye is obtained by replacing β-dimethylamino-p-phenetidine in this example with an equivalent amount of p-(3-dimethylaminopropoxy)-aniline.

Likewise, similar yellow dyes are obtained by replacing said dimethylamino phenetidine with an equivalent amount of $N^\alpha,N^\alpha$-dimethyltoluene-α,3-diamine, $N^\alpha,N^\alpha$-dimethyltoluene-α,4-diamine, or p-(3-dimethylamino-propyl)aniline.

Example 2

A mixture of 3.1 parts of 4-chloro-3-nitrobenzene-sulfonanilide, 3.0 parts of β-dimethylamino-p-phenetidine dihydrochloride, 2.0 parts of sodium carbonate, 25 parts of water, 25 parts of n-propanol and 0.1 part of a long chain alcohol sulfate is stirred under reflux for 8 hours. After cooling to room temperature the yellow crystalline product, $N^4$-[p-(2-dimethylaminoethoxy)phenyl]-3-nitrosulfanilanilide, is filtered off, washed with a 50% aqueous solution of isopropanol and dried.

When the β-dimethylamino-p-phenetidine dihydrochloride in this example is replaced by an equivalent amount of p-(3-dimethylaminopropoxy)aniline hydrochloride, the homologous $N^4$-[p-(3-dimethylaminopropoxy)phenyl]-3-nitrosulfanilanilide is obtained. Said phenetidine compound may also be replaced by equivalent amounts of the dihydrochlorides of $N^\alpha,N^\alpha$-dimethyltoluene-α,4-diamine, p-(3-dimethylaminopropyl)aniline, p-(3-n-butylmethylaminopropyl)aniline, or β-isopropylmethylamino-p-phenetidine, to produce similar yellow dyes.

Likewise, the 4-chloro-3-nitrobenzenesulfonanilide may be replaced by equivalent amounts of the arylamides prepared by condensing 4-chloro-3-nitrobenzenesulfonyl chloride with amines of the group, ethylamine, butylamine, o-, m-, or p-toluidine, p-phenetidine, p-butoxyaniline and 4-biphenylamine, using the method illustrated in the following example.

Example 3.—Preparation of the initial material

A mixture of 26 parts of 4-chloro-3-nitrobenzenesulfonyl chloride, 26 parts of water, 26 parts of isopropanol and 14 parts of p-phenetidine is stirred at 20° to 25° C. for one hour. After adding 50 parts af water and heating to 50° C. in one hour, 5 parts of sodium carbonate are slowly added and the mixture is stirred at 50° C. for one hour. After cooling to room temperature the product (4-chloro-3-nitrobenzenesulfon-p-phenetidide, is filtered off, washed and dried.

The tertiary amino compounds obtained according to Example 2 may be converted into their salt form by the method shown in Example 1.

The tertiary amino compounds of either Example 1 or Example 2 may be converted into quaternary ammonium derivatives by known methods, which are particularly illustrated in the following additional examples:

Example 4.—Quaternary compound

A mixture of 3.8 parts of $N^4$-[p-(2-dimethylaminoethoxy)phenyl]-3-nitrosulfanilamide (the free base obtained in Example 1 before conversion to the hydrochloride), 1.5 parts of dimethyl sulfate and 18 parts of acetone are heated under reflux for six hours. After cooling to room temperature, the yellow precipitate of trimethyl - [2 - (p - [4 - sulfamoyl - 2 - nitroanilino]phenoxy)ethyl]ammonium methyl sulfate is collected on a filter and washed with acetone. This product dyes modified "Dacron" polyester and "Orlon" acrylic fibers in yellow shades with good fastness properties.

When the dimethyl sulfate used in this example is replaced by an equivalent amount of methyl iodide or diethyl sulfate, other quaternary ammonium salts are obtained which have similar dyeing properties to the compound described above.

Example 5.—Quaternary compound

A mixture of 5 parts of $N^4$-[p-(2-dimethylaminoethoxy)phenyl]-3-nitrosulfanilanilide (from Example 2), 2 parts of benzyl chloride, and 15 parts of n-butanol is stirred at 100° C. for 2 hours. After cooling to room temperature, the quaternary ammonium salt is collected on a filter and washed with a little acetone. This product, benzyldimethyl[2 - (p - [4 - (phenylsulfamoyl)-2-nitroanilino]-phenoxy)ethyl]ammonium chloride, is represented by the formula:

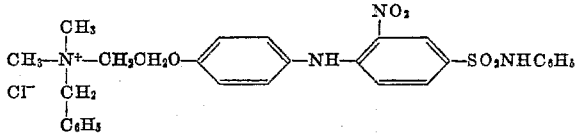

It dyes modified "Dacron" and "Orlon" in light-fast, yellow shades from a hot, slightly acidified, aqueous dye bath.

When the benzyl chloride used in this example is replaced by an equivalent amount of methyl-p-toluenesulfonate, the trimethylammonium derivative is obtained. This product also dyes modified "Dacron" and "Orlon" in yellow shades.

It will be understood that the details of the above examples may be varied widely within the skill of those engaged in this art.

For instance, in lieu of hydrogen chloride in the above examples, other acids may be employed, for example hydrobromic, nitric, sulfuric or phosphoric acid. Likewise, in aqueous solution, the dye cation will be associated with acid anions upon addition of salts such as sodium or potassium sulfate, chloride, phosphate, etc.

As quaternizing agents, in lieu of or in addition to those mentioned in the examples, any known quaternizing agent may be employed, including specifically the following:

p-$CH_3C_6H_4CH_2Cl$, $C_6H_5CH_2CH_2Cl$, $C_6H_5CH_2Cl$, or their bromide analogs; dimethyl sulfate, diethyl sulfate, dipropyl sulfate, dibutyl sulfate and short chain aliphatic chlorides and bromides in general.

The X-substituent in the anilino radical may be in position, para, meta or ortho to the NH-group. In lieu of the various monotertiary diamines mentioned in the above examples for initial condensation with 4-chloro-3-nitrobenzene-sulfonyl chloride, the corresponding mono- or dihydrochlorides may be employed, if more readily available, provided a corresponding adjustment is made in the quantity of sodium carbonate employed. Conversely, where the dihydrochloride of the initial material is mentioned, it may be replaced by the corresponding base, with or without an adjustment in the quantity of sodium carbonate employed, inasmuch as an excess of the latter makes no difference.

The alkali metal carbonate may be dispensed with altogether where a large excess of the monotertiary diamine is employed.

The novel compounds of the invention are useful primarily as yellow dyes for acid-modified "Dacron" polyester fiber. Their chief advantages are those of light fastness and water solubility. This achievement is remarkable when one considers that only a very limited number of high quality dyes have been discovered heretofore that are suitable for this new fiber.

We claim as our invention:

1. A dye compound of the group consisting of the free base form, salts and quaternized compounds of a compound whose free base form corresponds to the formula

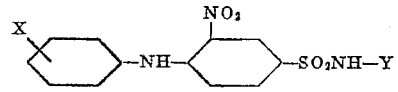

wherein X is a tertiary nitrogenous base radical of the group consisting of dialkylaminoalkyl and dialkylaminoalkoxy, wherein all the alkyl radicals named contain not over 4 C-atoms each, while the alkoxy radical contains from 2 to 4 C-atoms, and wherein Y is a member of the group consisting of hydrogen, alkyl of 1 to 4 C-atoms, phenyl, tolyl, biphenyl and alkoxyphenyl having from 1 to 4 C-atoms in the alkoxy group.

2. $N^4$-[p-(2-dimethylaminoethoxy)phenyl]-3-nitrosulfanilanilide.

3. $N^4$-[p-(2-dimethylaminoethoxy)phenyl]-3-nitrosulfanilamide hydrochloride.

4. Trimethyl[2 - (p - [4-sulfamoyl - 2 - nitroanilino] - phenoxy)ethyl]ammonium methyl sulfate.

No references cited.